(12) United States Patent
Zhong et al.

(10) Patent No.: US 11,908,152 B2
(45) Date of Patent: Feb. 20, 2024

(54) ACCELERATION METHOD OF DEPTH ESTIMATION FOR MULTIBAND STEREO CAMERAS

(71) Applicants: DALIAN UNIVERSITY OF TECHNOLOGY, Liaoning (CN); PENG CHENG LABORATORY, Guangdong (CN)

(72) Inventors: Wei Zhong, Liaoning (CN); Hong Zhang, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN); Shengquan Li, Liaoning (CN)

(73) Assignees: DALIAN UNIVERSITY OF TECHNOLOGY, Liaoning (CN); PENG CHENG LABORATORY, Guangdong (CN)

(*) Notice: Subject to any disclaimer, the term of this patent is extended or adjusted under 35 U.S.C. 154(b) by 379 days.

(21) Appl. No.: 17/603,856

(22) PCT Filed: Mar. 5, 2020

(86) PCT No.: PCT/CN2020/077958
§ 371 (c)(1),
(2) Date: Oct. 14, 2021

(87) PCT Pub. No.: WO2021/138989
PCT Pub. Date: Jul. 15, 2021

(65) Prior Publication Data
US 2022/0215569 A1     Jul. 7, 2022

(30) Foreign Application Priority Data
Jan. 10, 2020 (CN) .......................... 202010027773.4

(51) Int. Cl.
*G06T 7/593* (2017.01)
*G06T 7/80* (2017.01)

(52) U.S. Cl.
CPC ................ *G06T 7/596* (2017.01); *G06T 7/85* (2017.01); *G06T 2207/10012* (2013.01); *G06T 2207/20228* (2013.01)

(58) Field of Classification Search
None
See application file for complete search history.

(56) References Cited

U.S. PATENT DOCUMENTS

| 2012/0057053 A1* | 3/2012 | Mallon | ............... G01M 11/0264 348/E5.079 |
| 2019/0166350 A1* | 5/2019 | Park | ..................... H04N 13/156 |

(Continued)

FOREIGN PATENT DOCUMENTS

| CN | 106570899 A | 4/2017 |
| CN | 109801325 A | 5/2019 |
| CN | 110310320 A | 10/2019 |

OTHER PUBLICATIONS

Bosch, Marc, et al. "Semantic stereo for incidental satellite images." 2019 IEEE Winter Conference on Applications of Computer Vision (WACV). IEEE, 2019. (Year: 2019).*

(Continued)

*Primary Examiner* — Tahmina N Ansari
(74) *Attorney, Agent, or Firm* — Muncy, Geissler, Olds & Lowe, P.C.

(57) ABSTRACT

The present invention belongs to the field of image processing and computer vision, and discloses an acceleration method of depth estimation for multiband stereo cameras. In the process of depth estimation, during binocular stereo matching in each band, through compression of matched images, on one hand, disparity equipotential errors caused by binocular image correction can be offset to make the (Continued)

matching more accurate, and on the other hand, calculation overhead is reduced. In addition, before cost aggregation, cost diagrams are transversely compressed and sparsely matched, thereby reducing the calculation overhead again. Disparity diagrams obtained under different modes are fused to obtain all-weather, more complete and more accurate depth information.

4 Claims, 3 Drawing Sheets

(56) References Cited

U.S. PATENT DOCUMENTS

2022/0207776 A1\* 6/2022 Zhong ............... G06T 7/593
2022/0215569 A1\* 7/2022 Zhong ............... G06T 7/596

OTHER PUBLICATIONS

Dan Kong et al., "A Method for Learning Matching Errors in Stereo Computation", British Machine Vision Conference 2004, Sep. 9, 2004 (Sep. 9, 2004), (pp. 10).

\* cited by examiner

ACCELERATION METHOD OF DEPTH ESTIMATION FOR MULTIBAND STEREO CAMERAS

TECHNICAL FIELD

The present invention belongs to the field of image processing and computer vision, and relates to multiband stereo depth estimation and an acceleration method thereof, and particularly to an acceleration method of a depth estimation process for multiband stereo cameras.

BACKGROUND

The binocular stereo vision technology based on visible light band is developed to be relatively mature. Visible light imaging has rich contrast, color and shape information, so matching information between binocular images can be obtained accurately and quickly so as to obtain scenario depth information. However, visible light band imaging has defects, and the imaging quality thereof is greatly reduced, for example, in strong light, fog, rain, snow or night, which affects the matching precision. Therefore, the establishment of a multiband stereo vision system by using the complementarity of different band information sources is an effective way to realize three-dimensional reconstruction of space in special environments.

For example, a visible light band binocular camera and an infrared band binocular camera are used to constitute a multiband stereo vision system, and the advantage of not being affected by fog, rain, snow and light of infrared imaging is used to make up for the deficiency of visible light band imaging so as to obtain more complete and precise depth information.

In the multiband information complementary system, it is critical to fuse the multiband information to obtain the final depth information. A mainstream multiband information fusion mode is the fusion of point cloud information obtained in multiple bands, i.e., the infrared binocular image and the visible light binocular image as well as the calibration data of the infrared binocular camera and the calibration data of visible light are used for respectively generating point cloud corresponding to the infrared band and the visible light band and the fusion of the multiband binocular point cloud is explored by means of rigid transformation between an infrared unit and a visible light unit and various point cloud registration and fusion algorithms (Research on Integration Algorithm of Infrared and Visible 3D Point Cloud). The above method respectively matches the binocular cameras in different bands, maps the images into three-dimensional information according to matching results, and fuse the information on a point cloud level, thereby greatly increasing the calculation amount and resource consumption and making it difficult to apply to actual products.

In order to reduce the calculation consumption, the researchers have studied and improved the multiband stereo imaging system composed of infrared and visible light bands. For example, Dr. Tong Ying fused infrared and visible light information at a two-dimensional image level, used infrared band information to repair and enhance the missing visible light band information, and conducted stereo matching and three-dimensional reconstruction on the basis of the generated fusion image (Research on Several Key Techniques of 3D Reconstruction Based on Infrared and Visible Light Image Fusion [D], Tianjin University, 2015). The key step of binocular depth estimation is to obtain the position, i.e., binocular matching information, of each pixel of the left FIG. 1 in the right figure R according to pixel intensity and relative position information between pixels, and the corresponding pixels of binocular images need to satisfy strict geometrical relationships so that the binocular depth information can be obtained according to the binocular matching information. Although the above method for fusing the visible light image and the infrared image at the two-dimensional image level recovers the approximate structure of the image and the pixel intensity information, the errors and uncertainty factors in the fusion process may change the geometrical relationships between matching pixel pairs. In addition, because the slight change of the pixel intensity and the slight change of the local structure caused by the uncertainty factors of the fusion may lead to the increase of the matching cost among the corresponding pixel points, the matching precision is influenced.

In view of the above situation, to avoid the influence of deep fusion on the matching precision, the present invention proposes a multiband depth estimation method. Each band image is subjected to stereo matching before image fusion; secondly, multiband information fusion is conducted at a disparity level according to confidence; and finally, disparity is converted into depth information. In order to ensure calculation efficiency, the present invention proposes an acceleration strategy according to the proposed depth estimation method for multiband stereo cameras, i.e., a strategy of energy propagation conducted after compressing images to be matched and compressing initial matching cost. Image compression and sparse propagation ensure disparity accuracy and simultaneously greatly reduce calculation overhead. In addition, depth information fusion does not need the operation of conversion between two dimensions and three dimensions and projection mapping optimization, and greatly increases the efficiency compared with fusion on the point cloud information.

SUMMARY

The present invention aims to overcome the defects of the prior art and provides a depth estimation method for multiband stereo cameras and an acceleration strategy thereof, which reduces calculation overhead by compressing matched images and conducting sparse propagation, and fuses disparity diagrams obtained by sensors under different modes to obtain all-weather, more complete and more accurate depth information.

The specific solution comprises the following steps:

An acceleration method of depth estimation for multiband stereo cameras comprises the following steps:

step 1, calibrating respective internal and external parameters of multiband binocular cameras, wherein the internal parameters comprise a focal length and an optical center, and the external parameters comprise rotation and translation; correcting binocular images outputted by the binocular cameras in different bands into a parallel equipotential relationship; and jointly calibrating the multiband binocular cameras to obtain position relationship parameters among devices of different bands, comprising rotation and translation;

step 2, registering the multiband binocular cameras to obtain a coordinate conversion matrix of corresponding pixels among images collected by the devices of different bands, i.e., a homography matrix; denoising a binocular image pair in each band; and conducting longitudinal compression on the image pair in each band to save matching efficiency;

step 3, matching the binocular images according to a semi-global matching (SGM) method to obtain respective initial cost diagrams of the multiband binocular images; compressing the initial cost diagrams to increase propagation efficiency; conducting energy propagation on the compressed sparse cost diagrams to correct and optimize error matching; finding a disparity corresponding to minimum energy for each pixel position according to an energy propagation diagram to obtain a disparity diagram;

step 4, optimizing the disparity diagram, recovering the optimized disparity into an original scale through an upsampling method, and obtaining a final depth map according to a disparity fusion method.

The present invention has the following beneficial effects:

The present invention proposes an acceleration method of depth estimation for multiband stereo cameras based on multiband binocular depth estimation to ensure calculation efficiency, satisfy real-time requirements of practical application and simultaneously obtain a high-quality fused depth image. The present invention has the following advantages:

1 The present invention proposes an acceleration method of depth estimation for stereo cameras. In the process of depth estimation, during binocular stereo matching in each band, through compression of the matched images, on one hand, parallel equipotential errors caused by binocular image correction can be offset to make the matching more accurate, and on the other hand, calculation overhead is reduced. In addition, before cost aggregation, the cost diagrams are transversely compressed and sparsely matched, thereby reducing the calculation overhead again.

2 The present invention proposes an acceleration method of all-weather depth estimation for multiband stereo cameras. The disparity diagram participating in fusion is obtained according to the binocular images of corresponding bands. The strategy of matching first and then disparity fusion reduces the matching error caused by the error of multiband image fusion; the disparity level fusion avoids the calculation consumption of three-dimensional point cloud level fusion; and the disparity estimation speed is further increased through longitudinal compression images and transverse compression cost diagrams. The method can select the accurate information of each band and achieve the purpose of complementary advantages of multiband equipment.

DETAILED DESCRIPTION

Figure 1:
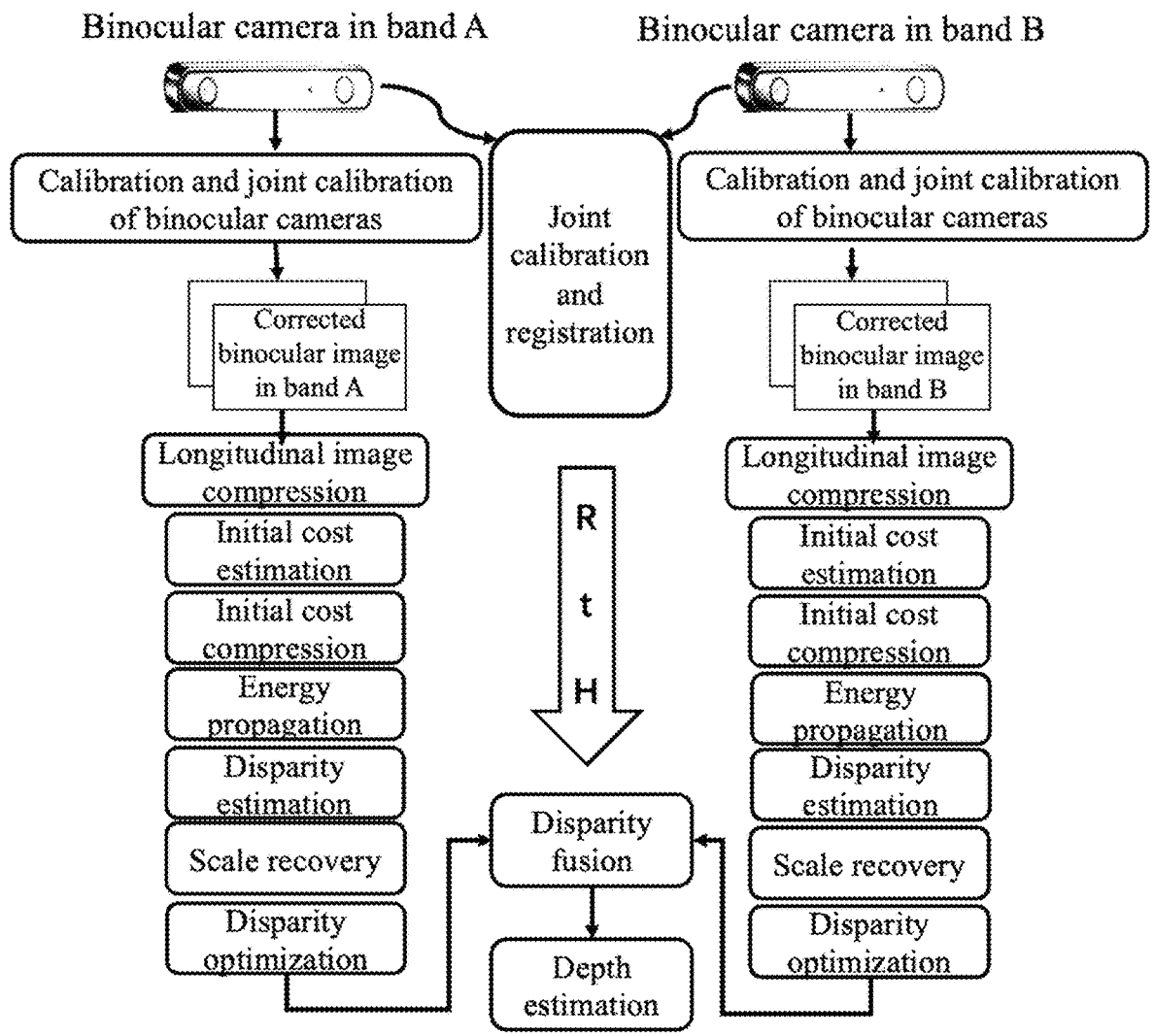
FIG. 1 is an overall flow chart of a solution.
Figure 2:
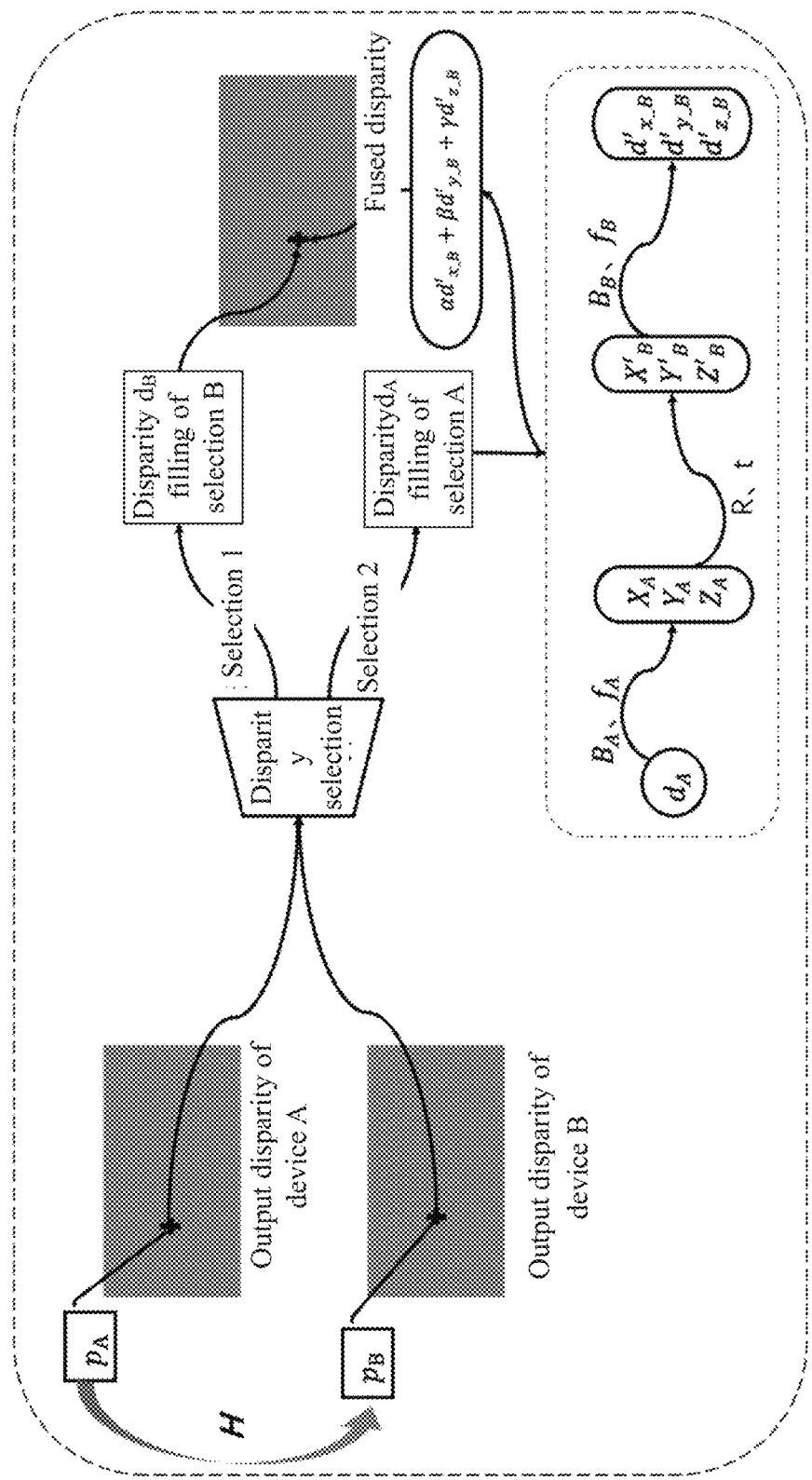
FIG. 2 shows a detailed flow of a disparity fusion module.
Figure 3:
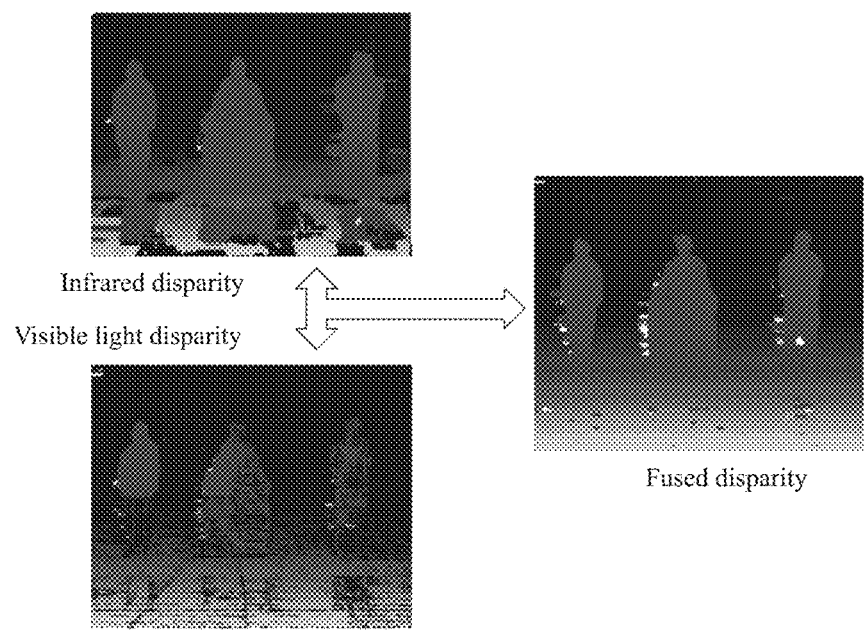
FIG. 3 is an effect diagram after disparity fusion.

The present invention fuses the disparity diagrams obtained based on a multiband device according to a multiband sensor device and a binocular disparity estimation method, and calculates distance information according to the triangulation measurement principle and the fused disparity to use the imaging advantages of devices of different bands under different environments. By taking the depth estimation of a pair of visible light binocular cameras and a pair of infrared binocular cameras as an example, a specific implementation solution is as follows:

FIG. 1 shows an overall flow of the solution.

Step 1, respectively calibrating each lens of a visible light binocular camera and an infrared binocular camera and jointly calibrating respective systems;

1.1 Respectively calibrating the infrared camera and the visible light camera by the Zhangzhengyou calibration method to obtain internal parameters such as focal length and principal point position and external parameters such as rotation and translation of each camera.

1.2 Jointly calibrating the visible light binocular camera to obtain external parameters such as rotation and translation of two cameras of a binocular camera system; jointly calibrating the infrared binocular camera to obtain external parameters such as rotation and translation of two cameras of an infrared binocular system; correcting output image pairs according to the respective external parameters of the binocular camera system so that the binocular images outputted by the same binocular camera system satisfy the parallel equipotential relationship.

Step 2, jointly calibrating and registering the visible light binocular camera system and the infrared camera system;

2.1 Jointly calibrating the left lens of the visible light binocular system and the left lens of the infrared binocular system by the Zhangzhengyou calibration method to obtain external parameters such as rotation and translation of the visible light camera and the infrared camera.

2.2 Simultaneously shooting the images of checkers in different planes by two pairs of binocular cameras, calculating the positional relationship of the same plane in the visible light image and the infrared image by using RT obtained by joint calibration and the detected checker corners, and representing the positional relationship with a homography matrix H.

2.3 Denoising and filtering input images by a Gaussian filtering algorithm. The weight of a Gaussian filtering window is determined by a Gaussian function, formula 1.

$$h(x, y) = e^{-\frac{x^2+y^2}{2\sigma^2}} \quad (1)$$

wherein (x,y) is a point coordinate and a is a standard deviation. The Gaussian function is discretized to obtain a weight matrix, i.e., a Gaussian filter.

Through Gaussian filtering, noise can be effectively suppressed and the image is smoothed. Subsequent matching errors caused by the noise are prevented.

2.4 Longitudinally compressing the left input image and the right input image, so that on one hand, parallel equipotential errors caused by binocular correction are offset, and on the other hand, matching speed is increased.

The longitudinal compression method is: two adjacent rows take a mean value and compressed into one row, i.e., $$I(x,y \text{ quotient } 2)=(I(x,y)+I(x,y+1))/2$$

wherein quotient represents quotient operation. I is an image to be compressed, (x,y quotient 2) is the image coordinate after compression, and (x,y) is the image coordinate before compression.

Step 3, 3.1 conducting initial cost calculation. Sliding window matching based on Census features is taken as an example herein to describe the flow of matching cost calculation.

A Census feature descriptor of each pixel is obtained. A sliding window is used for search on a scanning line to calculate the cost corresponding to the possible disparity of each pixel, formula 2:

$$\text{Cost}_{d,d\in D_{max}}(x,y)=HD(\text{CensusL}(x,y),\text{CensusR}(x-d,y)) \quad (2)$$

In the formula, HD(•) represents a Hamming distance, and CensusL and CensusR are respectively Census feature descriptors of a left diagram pixel and a right diagram pixel. The output of cost calculation is a tensor of size height(H)×width(W)×maximum disparity(D), i.e., the initial cost diagram.

3.2 Transversely compressing the initial cost diagram. Energy propagation needs to select the information of the position similar to the current position in the semi-global as a reference to update the cost of the current position. In order to improve the calculation efficiency, semi-global propagation is changed to sparse propagation, and through experiments, it is found that the operation can reduce the calculation overhead without losing the accuracy. The specific mode is to conduct transverse down-sampling for the initial cost diagram and keep data in alternate columns.

3.3 Conducting energy propagation on the sparse cost diagram to obtain an energy diagram and then to obtain the disparity diagram.

The energy is described as follows:

$$E(D) = \sum_p C(p, D_p) + \sum_{q \in N_p} P_1 T[|D_p - D_q| = 1] + \sum_{q \in N_p} P_2 T[|D_p - D_q| > 1]] \quad (3)$$

wherein $C(p, D_p)$ is the cost at position p when the disparity is $D_p$, T[•] is an indicator function, and the output is 1 when the input satisfies the conditions within [ ], otherwise, is 0. $P_1$ and $P_2$ are penalty terms. $D_q$ is a disparity value at position q.

According to formula (4), in accordance with the global structure of the image, the cost distribution information of surrounding pixels is transmitted to the center pixel from multiple directions.

$$L_r(p, d) = C(p, d) + \min\begin{pmatrix} L_r(p-r, d), L_r(p-r, d-1) + P_1, \\ L_r(p-r, d+1) + P_1, \\ \min_i L_r(p-r, i) + P_2 \end{pmatrix} - \min_k L_r(p-r, k) \quad (4)$$

$L_r(p,d)$ is aggregation energy when the disparity at position p is d, and r is a transfer direction.

After energy propagation, a tensor of size height(H)×width(W)×maximum disparity(D), i.e., the energy diagram, is obtained. Energy propagation conducted successively in four directions of from top to bottom (TB), from left top to bottom right (LTB), from left to right (LR) and from right to left (RL) is taken as an example.

A disparity corresponding to minimum energy is found for each pixel position according to an energy propagation diagram, which is the integer disparity d(x,y) of the pixel.

$$d(x, y) = \arg\min_{i \in D_{max}} \text{energy}(i) \quad (5)$$

The energy (•) is the energy after aggregation.

A subpixel level disparity diagram is calculated by using the energy diagram and an integral pixel disparity diagram.

Step 4, 4.1 Filtering the obtained disparity diagram to remove invalid disparity.

Firstly, speckle filtering is conducted on the image to remove the outlier in the disparity diagram.

$$p(x, y) = \begin{cases} 0, & \begin{bmatrix} \sum_{(i,j) \in \Omega(x,y)} T \\ p(i, j) > (1+t) \cdot p(x, y)\| \\ p(i, j) < (1-t) \cdot p(x, y) \end{bmatrix} > t1 \\ p(x, y), & \text{other} \end{cases} \quad (6)$$

p(x,y) is a disparity value at position (x,y); t and t1 are thresholds, counted and obtained by experiments and stored in hardware in advance; T[•] is an indicator function; and the output is 1 when the input satisfies the conditions within [ ], otherwise, is 0. $\Omega(x,y)$ is a local region centered on (x,y).

Median filtering is conducted on the disparity diagram.

$$p(x,y) = \text{median}_{(i,j) \in \Omega(x,y)}(p(i,j)) \quad (7)$$

Step 4, restoring the scale of the disparity image. The width and the height of the disparity image obtained in the above process are both ½ of the original scale; and the nearest neighbor interpolation mode is selected to amplify the disparity image in the transverse and longitudinal directions to restore the scale.

The disparity fusion method is specifically operated as follows:

1. The disparity diagram disparity$_{vis}$ obtained by the visible light binocular camera and the disparity diagram disparity$_{ir}$ obtained by the infrared binocular camera are fused according to the homography matrix H, the translation and rotation positional relationships between the visible light system and the infrared system and two confidence marker bits.

2 Finally, the depth diagram is calculated according to the fused disparity, and the relationship formula between the disparity and the depth is as follows:

$$Z = \frac{B \times f}{d} \quad (8)$$

wherein B is baseline length, f is the focal length, Z is the depth and d is the disparity.

The invention claimed is:

1. An acceleration method of depth estimation for multiband stereo cameras, comprising the following steps:
step 1, calibrating respective internal and external parameters of multiband binocular cameras, wherein the internal parameters comprise a focal length and an optical center, and the external parameters comprise rotation and translation; correcting binocular images outputted by the binocular cameras in different bands into a parallel equipotential relationship; and jointly calibrating the multiband binocular cameras to obtain position relationship parameters among devices of different bands, comprising rotation and translation;
step 2, registering the multiband binocular cameras to obtain a coordinate conversion matrix of corresponding pixels among images collected by the devices of different bands, i.e., a homography matrix; denoising a binocular image pair in each band; and conducting longitudinal compression on the image in each band to save matching efficiency;

step 3, matching the binocular images according to a semi-global matching (SGM) method to obtain respective initial cost diagrams of the multiband binocular images; compressing the initial cost diagrams to increase propagation efficiency; conducting energy propagation on the compressed sparse cost diagrams to correct and optimize error matching; finding a disparity corresponding to minimum energy for each pixel position according to an energy propagation diagram to obtain a disparity diagram;

step 4, optimizing the disparity diagram, recovering the optimized disparity into an original scale through an upsampling method, and obtaining a final depth map according to a disparity fusion method.

2. The acceleration method of depth estimation for multiband stereo cameras according to claim 1, wherein in step 2, the longitudinal compression method of conducting longitudinal compression on the image in each band is: two adjacent rows take a mean value and compressed into one row, i.e., $$I(x,y \text{ quotient } 2) = (I(x,y) + I(x,y+1))/2$$

wherein quotient represents quotient operation; I is an image to be compressed, (x,y quotient 2) is the image coordinate after compression, and (x,y) is the image coordinate before compression.

3. The acceleration method of depth estimation for multiband stereo cameras according to claim 1, wherein in step 3, the specific mode of compressing the initial cost diagram is to conduct transverse down-sampling for the initial cost diagram and keep data in alternate columns.

4. The acceleration method of depth estimation for multiband stereo cameras according to claim 1, wherein in step 3, energy propagation is conducted on the sparse cost diagram to obtain an energy diagram and then to obtain the disparity diagram by a principle "Winner takes all". the energy is described as follows:

$$E(D) = \sum_p C(p, D_p) + \qquad (3)$$

$$\sum_{q \in N_p} P_1 T[|D_p - D_q| = 1] + \sum_{q \in N_p} P_2 T[|D_p - D_q| > 1]]$$

wherein $C(p, D_p)$ is the cost at position p when the disparity is $D_p$, $T[\bullet]$ is an indicator function, and the output is 1 when the input satisfies the conditions within [ ], otherwise, is 0; $P_1$ and $P_2$ are penalty terms; $D_q$ is a disparity value at position q;

according to formula (4), in accordance with the global structure of the image, the cost distribution information of surrounding pixels is transmitted to the center pixel from multiple directions.

$$L_r(p, d) = C(p, d) + \qquad (4)$$
$$\min \begin{pmatrix} L_r(p-r, d), L_r(p-r, d-1) + P_1, \\ L_r(p-r, d+1) + P_1, \\ \min_i L_r(p-r, i) + P_2 \end{pmatrix} - \min_k L_r(p-r, k)$$

$L_r(p,d)$ is aggregation energy when the disparity at position p is d, and r is a transfer direction;

after energy propagation, a tensor of size height(H)×width(W)×maximum disparity(D), i.e., the energy propagation diagram, is obtained; a disparity corresponding to minimum energy is found for each pixel position according to an energy propagation diagram, which is the integer disparity d(x,y) of the pixel;

$$d(x, y) = \arg\min_{i \in D_{max}} \text{energy}(i) \qquad (5)$$

the energy (•) is the energy after aggregation;

a subpixel level disparity diagram is calculated by using the energy diagram and an integral pixel disparity diagram.

* * * * *